United States Patent [19]

Bunyan

[11] 4,226,444
[45] Oct. 7, 1980

[54] PIPE JOINTS

[75] Inventor: Thomas W. Bunyan, London, England

[73] Assignee: Pilgrim Engineering Developments Limited, London, England

[21] Appl. No.: 973,459

[22] Filed: Dec. 26, 1978

Related U.S. Application Data

[62] Division of Ser. No. 771,091, Feb. 23, 1977, Pat. No. 4,153,656.

[51] Int. Cl.$^2$ ............................................. F16L 13/10
[52] U.S. Cl. .................................... 285/21; 285/97; 285/294
[58] Field of Search .................. 285/97, 294, 297, 21, 285/105, 292

[56] References Cited

U.S. PATENT DOCUMENTS

| | | | |
|---|---|---|---|
| 333,011 | 12/1885 | Hoeveler | 285/294 |
| 339,036 | 3/1886 | Wilbur | 285/294 |
| 1,494,523 | 5/1924 | Zwicker | 285/97 X |
| 2,083,842 | 6/1937 | Henning | 285/97 X |
| 2,462,348 | 2/1949 | Batchler | 285/297 |
| 3,094,452 | 6/1963 | Von Riegen et al. | 285/21 X |
| 3,422,179 | 1/1969 | Bauer et al. | 285/21 X |
| 3,843,167 | 10/1974 | Gronstedt | 285/105 X |
| 3,860,270 | 1/1975 | Arnold | 285/96 X |
| 3,943,334 | 3/1976 | Sturm | 285/21 X |

FOREIGN PATENT DOCUMENTS

| | | | |
|---|---|---|---|
| 1293371 | 10/1972 | United Kingdom | 285/297 |
| 1345514 | 1/1974 | United Kingdom | 285/97 |

Primary Examiner—Thomas F. Callaghan
Attorney, Agent, or Firm—Woodcock, Washburn, Kurtz, Mackiewicz & Norris

[57] ABSTRACT

A method of joining pipes in which a sleeve is placed over the adjacent ends of the pipes so as to overlap each pipe. The sleeve fits with clearance around the pipe ends. The ends of the clearance space are closed by inflating hollow sealing rings and then epoxy resin is injected into the clearance space to fill the space. The pressure of the epoxy resin composition is then raised to a pressure substantially greater than atmospheric and the pressure is maintained until the resin composition is set.

7 Claims, 6 Drawing Figures

PIPE JOINTS

This is a division of application Ser. No. 771,091, filed Feb. 23, 1977, issued May 8, 1979 as U.S. Pat. No. 4,153,656.

The present invention relates to a pipe joint and to a method of joining pipes, and is concerned particularly, but not exclusively with pipe joints for oil or glass pipelines.

According to the present invention in one aspect, a method of forming a joint between a pipe end and a coupling sleeve which fits with clearance around the pipe end, comprises placing the coupling sleeve around the pipe end, closing the ends of the clearance space between the coupling sleeve and the pipe end, injecting a hardenable composition into the space between the coupling and the pipe end to fill the space, and maintaining the pressure in the hardenable composition at a pressure substantially greater than atmosphere pressure until set. Preferably the pressure should be of the order of the working pressure of the pipe.

The hardenable composition may be portland cement but of preference it is an epoxy resin composition, such as that sold under the trademark "Araldite". The epoxy resin composition may include a filler such as carborundum powder which increases the coefficient of friction and crushing strength of the composition when set. Such a composition is sold under the trademark "Araldite SW 404".

In the case of an epoxy resin composition, the setting time for the joint may be substantially reduced by including a resistive heating wire in the clearance space and passing a current through the wire when the resin composition has been injected into the space. The current through the wire should be controlled so that the composition is raised to a temperature at which curing is accelerated, but not so high that it causes the composition to disintegrate.

The sleeve may have a helical screw thread in its bore for increasing the surface area in contact with the resin layer and thus improving the grip between the layer and the sleeve. For convenience the resistive heating wire may be located in the root of the screw thread, for example by gluing, prior to the sleeve being fitted around the pipe end.

To improve the grip between the pipe end and the resin layer, the end of the pipe may be roughened, for example by forming a helical groove using a rotary chipping hammer.

The invention may be used to form a joint between two pipe sections by placing the sleeve over the adjacent ends of pipe sections each pipe section being overlapped by half the sleeve.

In another aspect the present invention comprises a joint between a coupling sleeve and a pipe end, the coupling sleeve fitting with clearance around the pipe end, means for closing the ends of the clearance space between the pipe end and the sleeve, and a layer of a hardenable composition set under pressure greater than atmospheric filling the clearance space, so that when the interior of the pipe is at atmospheric pressure the pipe ends are pre-loaded inwardly.

The means for closing the ends of the clearance space may conveniently be hollow rubber rings located in grooves in the sleeve at each end of the clearance space. The rubber rings may be inflated by injecting with hydraulic fluid or preferably by injecting with a hardenable composition, so as to span the space between the sleeve and the pipe end.

The pipe joint of the present invention can be applied to pipes of any size up to the largest used in the petroleum off-shore or gas industry. The joint can be effected without welding and can be completed in a matter of 15 seconds, which makes it most attractive for very rapid undersea or land pipe laying operations. The joint is very compact and light to handle and cheap to produce—yet can have a strength equal to twice the strength of the pipe.

An embodiment of the invention will now be described by way of example with reference to the accompanying drawings of which:

Figure 1:
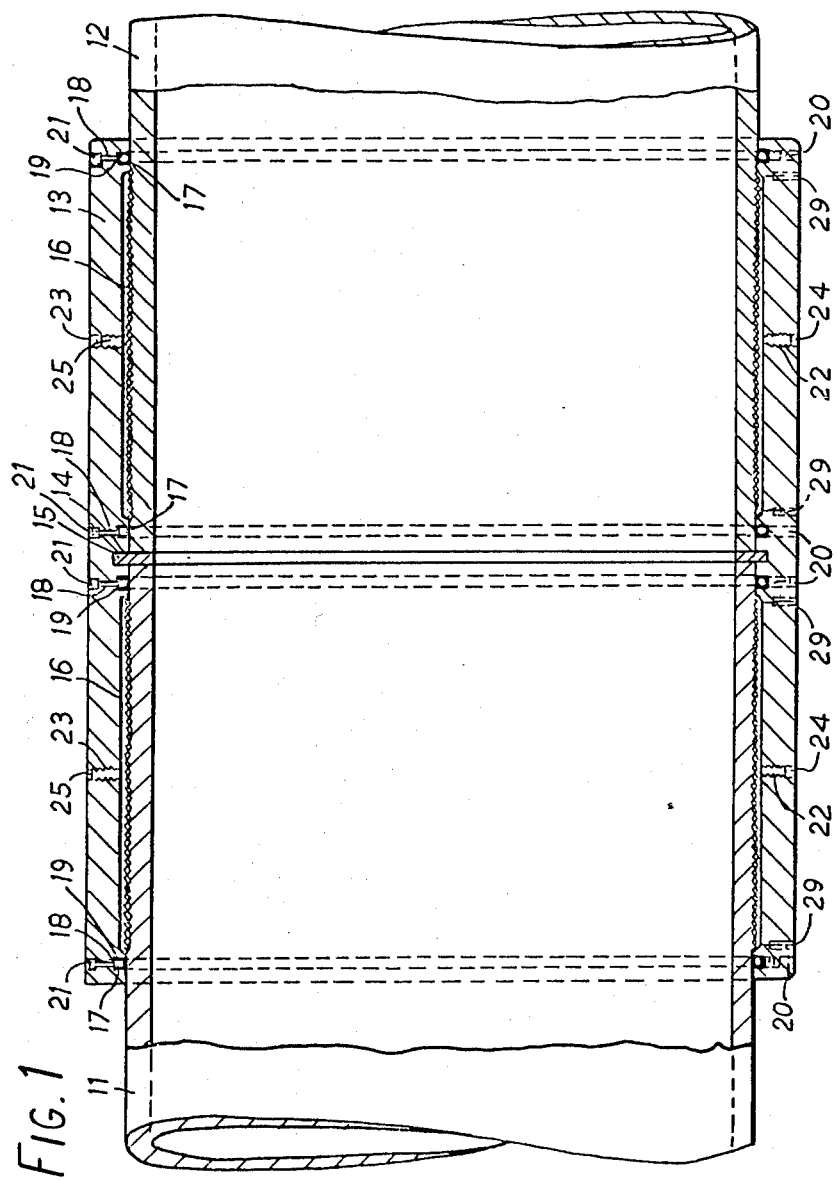
FIG. 1 shows a longitudinal cross-section through a pipe joint according to the invention.
Figure 2:
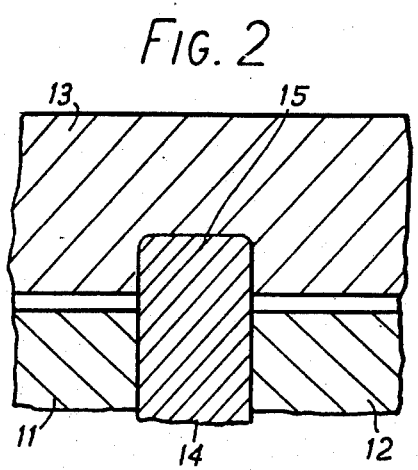
FIG. 2 shows a detail on an enlarged scale of an abutment ring in the pipe joint of FIG. 1.

Referring to the drawing two pipe sections 11 and 12 to be joined have ends that are free of any coating or other covering, and are prepared for joining by being brushed with wire brushes, their surfaces are roughened by high-speed rotary chipping hammers and they are then finally degreased before joining.

A coupling sleeve 13 has a split distance ring 14 permanently secured within a centrally disposed circumferential groove 15 machined in the bore of the coupling sleeve 13. The coupling sleeve is first slid over the end of one pipe 11 until the end of the pipe abuts the distance ring 14. The end of the other pipe 12 is then slid into the coupling sleeve 13 until the end of this pipe abuts the split distance ring 14.

Figure 6:
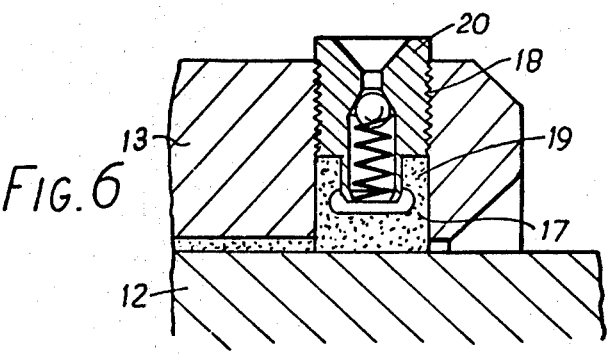
FIG. 6 shows a detail on the same scale as FIG. 2 of an inlet valve for a sealing ring of the pipe joint of FIG. 1.

At each end of the clearance spaces 16 between the respective pipe ends and the sleeve is an annular groove 17 in the surface of the bore of the sleeve. Ports 18 connect the grooves through the wall of the sleeve with the exterior at the top and bottom of the sleeve. A hollow sealing ring 19 of nitrile rubber is located in each groove 17. Injecting valves 20 (see FIG. 6) are located in the ports 18 at the bottom of the sleeve and air bleed valves 21 are located in the ports at the top of the sleeve, the valves 20 and 21 communicating with the interior of their respective sealing rings.

Figure 3:
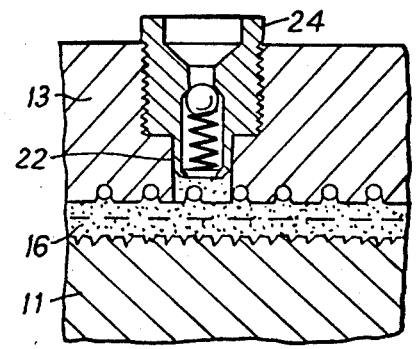
FIG. 3 shows a detail on the same scale as FIG. 2 of an injection port of the pipe joint of FIG. 1.
Figure 4:
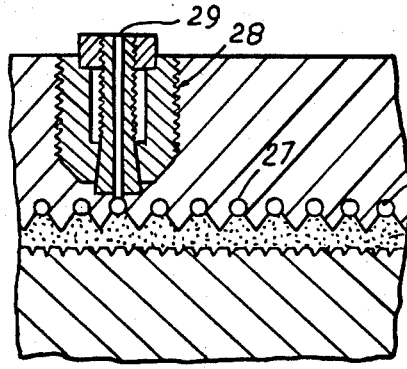
FIG. 4 shows a detail on the same scale as FIG. 2 of a terminal of a resistive heating wire of the pipe joint of FIG. 1.
Figure 5:
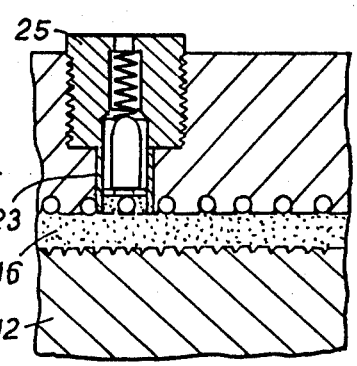
FIG. 5 shows a detail on the same scale as FIG. 2 of an air bleed port of the pipe joint of FIG. 1.

Each clearance space 16 can communicate with the exterior through an inlet port 22 at the bottom of the sleeve and an outlet port 23 at the top of the sleeve. Each inlet port 22 holds an injection valve 24 similar to the valve 20 (see FIG. 3) and each outlet port holds an air bleed valve 25 similar to the valve 21 (see FIG. 5).

The interior of the sleeve is grooved with a helical screw thread 26 to increase its surface area. A resistive heating wire 27 is contained within the screw thread 26, being secured at the root of the screw thread for example with adhesive. The ends of the resistive wire pass through bores 28 in the wall of the sleeve to terminals 29 on the outside of the sleeve.

After the sleeve has been located over the pipe ends as described above, the injection valves 20 and 24 are connected to injection manifolds (not shown) and the terminals 29 are connected to a supply of electric current with automatically controlled valves and switches (not shown).

Epoxy resin composition automatically metered and thoroughly mixed with hardener is injected through the injection valves 20 into the seal rings 19 which are at the terminations of each joint. Air is automatically bled out through air release valves 21 which shut firmly as soon as the epoxy composition follows the air through the valve. The pressure is then raised to the working pressure of the pipe. When this pressure reaches a pre-set value of say 15% of the maximum, resin injection automatically commences through injection valves 24, air being bled off though air bleed valves 25. The pressure is raised until a predetermined pressure is reached which may be say 75% of the working pressure. As soon as the pressure injected through injection valves 24 reaches a predetermined amount—indicating that the air bleed valves 25 have shut an electrical heating current is passed between the terminals 29 which are connected to the continuous heating wire 27 contained within the screw-thread groove 26 cut into the bore of the coupling sleeve 13. A controlled temperature is maintained for about 10 seconds which rapidly hardens off the epoxy trapped under pressure within the joint. So in a matter of seconds from start to finish a high strength joint is obtained.

In the embodiment described the effective length of the joint is about $0.7 \times D$ where D is the pipe diameter. For a 20" diam pipe of 0.5" wall thickness the strength of the joint equals $\pi \times 20 \times 0.7 \times 20 \times 3 = 2637$ tons.

Pipe strength $= \pi \times 20 \times 0.5 \times 35 = 1099$ tons $\therefore$ Factor of safety $= 2637/1099 = 2.4$ On a pipe laying barge for underwater pipe laying or on a pipe laying vehicle, a pipe harness connecting injection points 20 and 24 and the electrical heater terminals 29 is clipped on the joint sleeve and the injection heating and pressurizing process is automatically sequenced, and metered so that each joint is filled completely with a metered quantity of epoxy mixture before the heat is applied. This ensures that every joint is perfectly made.

The joint may be broken by simply maintaining the heat until 200° C. is reached when the epoxy resin composition disintegrates.

To summarize the joint described above has the advantages that no welding is used, it is very simple, the jointing procedure is fully automated and the strength is guaranteed. The jointing efficiency is ensured by metering joint filling, the quality and strength of the Epoxy mixture may be checked for each batch of resin and hardener delivered to site. The speed of making the joint is about 200 times faster than conventional joints. The joint is light and compact in construction, it is cheap to produce and the joint may be made or broken in seconds.

I claim:
1. A joint comprising:
   a coupling sleeve;
   a pipe end, said coupling sleeve fitting closely but with clearance around the pipe end; means for closing the ends of said clearance space between said pipe end and said sleeve, said means comprising grooves in said sleeve at each end of said clearance space, hollow sealing rings located in said grooves, and a hardenable composition injected in said sealing rings inflating said sealing rings so as to span said space between said sleeve and said pipe end; a layer of hardenable composition set under pressure substantially greater than atmospheric filling said clearance space and in intimate contact with said pipe end and said coupling sleeve so that when the interior of the pipe is at atmospheric pressure the pipe end is pre-stressed radially inwardly, the layer of hardenable composition extending substantially over the whole of the interface between the pipe end and the coupling sleeve.
2. A joint according to claim 1 in which the hardenable composition is an epoxy resin composition.
3. A joint according to claim 2 in which the epoxy resin composition includes a filler of carborundum powder.
4. A joint according to claim 1 including a resistive heating element located in the space between the sleeve and the pipe end.
5. A joint according to claim 4 including a helical screw thread in the bore of the sleeve and in which the resistive heating element is located in the root of said screw thread.
6. A joint according to claim 1 in which the end of the pipe is roughened.
7. A joint between two pipe sections in which each pipe section is joined to a common coupling sleeve using a pipe joint according to claim 1.

* * * * *